US011770007B2

(12) United States Patent
Goergen et al.

(10) Patent No.: US 11,770,007 B2
(45) Date of Patent: Sep. 26, 2023

(54) METHOD AND SYSTEM FOR INTEGRATION AND CONTROL OF POWER FOR CONSUMER POWER CIRCUITS

(71) Applicant: CISCO TECHNOLOGY, INC., San Jose, CA (US)

(72) Inventors: Joel Richard Goergen, Soulsbyville, CA (US); Chad M. Jones, Doylestown, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/963,475

(22) Filed: Oct. 11, 2022

(65) Prior Publication Data
US 2023/0033244 A1 Feb. 2, 2023

Related U.S. Application Data

(63) Continuation of application No. 17/367,744, filed on Jul. 6, 2021, now Pat. No. 11,621,565, which is a
(Continued)

(51) Int. Cl.
*H02J 3/38* (2006.01)
*H02J 13/00* (2006.01)
(Continued)

(52) U.S. Cl.
CPC ........ *H02J 3/381* (2013.01); *H02J 13/00002* (2020.01); *H02J 13/0004* (2020.01);
(Continued)

(58) Field of Classification Search
CPC .......... H02J 3/38; H02J 3/381; H02J 13/0004; H02J 13/00002; H02J 13/00; H02J 2300/28; H02J 3/32; H02J 2300/24; H04L 12/10
See application file for complete search history.

(56) References Cited

U.S. PATENT DOCUMENTS 3,335,324 A 8/1967 Buckeridge
4,811,187 A 3/1989 Nakajima
(Continued)

FOREIGN PATENT DOCUMENTS

CN 1209880 C 7/2005
CN 201689347 U 12/2010
(Continued)

OTHER PUBLICATIONS

Voltserver Inc., v. Cisco Technology, Inc., "Decision Denying Institution of Post-Grant Review," United States Patent and Trademark Office, PGR2021-00055, U.S. Pat. No. 10,735,105 B2, Aug. 19, 2021, 25 pages.
(Continued)

*Primary Examiner* — Robert L Deberadinis

(57) ABSTRACT

In one embodiment, a power system includes a power panel operable to distribute alternating current (AC) power and pulse power to a plurality of power outlets and having an AC circuit breaker and a pulse power circuit breaker, the pulse power comprising a sequence of pulses alternating between a low direct current (DC) voltage state and a high DC voltage state, a power inverter and converter coupled to the power panel through an AC power connection and a pulse power connection and including a DC power input for receiving DC power from a renewable energy source, an AC power input for receiving AC power, and a connection to an energy storage device, and a power controller in communication with the power inverter and converter and operable to balance power load and allocate power received at the DC power input and the AC power input to the power panel.

20 Claims, 7 Drawing Sheets

Related U.S. Application Data continuation of application No. 16/746,500, filed on Jan. 17, 2020, now Pat. No. 11,088,547.

(51) Int. Cl.
  *H04L 12/10* (2006.01)
  *H02J 3/32* (2006.01)

(52) U.S. Cl.
  CPC .............. *H04L 12/10* (2013.01); *H02J 3/32* (2013.01); *H02J 2300/24* (2020.01); *H02J 2300/28* (2020.01)

(56) References Cited

U.S. PATENT DOCUMENTS

| | | |
|---|---|---|
| 5,652,893 A | 7/1997 | Ben-Meir |
| 6,008,631 A | 12/1999 | Johari |
| 6,220,955 B1 | 4/2001 | Posa |
| 6,259,745 B1 | 7/2001 | Chan |
| 6,636,538 B1 | 10/2003 | Stephens |
| 6,685,364 B1 | 2/2004 | Brezina |
| 6,784,790 B1 | 8/2004 | Lester |
| 6,826,368 B1 | 11/2004 | Koren |
| 6,855,881 B2 | 2/2005 | Khoshnood |
| 6,860,004 B2 | 3/2005 | Hirano |
| 7,325,150 B2 | 1/2008 | Lehr |
| 7,420,355 B2 | 9/2008 | Liu |
| 7,490,996 B2 | 2/2009 | Sommer |
| 7,492,059 B2 | 2/2009 | Peker |
| 7,509,505 B2 | 3/2009 | Randall |
| 7,566,987 B2 | 7/2009 | Black et al. |
| 7,583,703 B2 | 9/2009 | Bowser |
| 7,589,435 B2 | 9/2009 | Metsker |
| 7,593,747 B1 | 9/2009 | Karam |
| 7,603,570 B2 | 10/2009 | Schindler |
| 7,616,465 B1 | 11/2009 | Vinciarelli |
| 7,813,646 B2 | 10/2010 | Furey |
| 7,835,389 B2 | 11/2010 | Yu |
| 7,854,634 B2 | 12/2010 | Filipon |
| 7,881,072 B2 | 2/2011 | DiBene |
| 7,915,761 B1 | 3/2011 | Jones |
| 7,921,307 B2 | 4/2011 | Karam |
| 7,924,579 B2 | 4/2011 | Arduini |
| 7,940,787 B2 | 5/2011 | Karam |
| 7,973,538 B2 | 7/2011 | Karam |
| 8,020,043 B2 | 9/2011 | Karam |
| 8,037,324 B2 | 10/2011 | Hussain |
| 8,068,937 B2 | 11/2011 | Eaves |
| 8,081,589 B1 | 12/2011 | Gilbrech |
| 8,184,525 B2 | 5/2012 | Karam |
| 8,276,397 B1 | 10/2012 | Carlson |
| 8,279,883 B2 | 10/2012 | Diab |
| 8,310,089 B2 | 11/2012 | Schindler |
| 8,319,627 B2 | 11/2012 | Chan |
| 8,345,439 B1 | 1/2013 | Goergen |
| 8,350,538 B2 | 1/2013 | Cuk |
| 8,358,893 B1 | 1/2013 | Sanderson |
| 8,638,008 B2 | 1/2014 | Baldwin et al. |
| 8,700,923 B2 | 4/2014 | Fung |
| 8,712,324 B2 | 4/2014 | Corbridge |
| 8,750,710 B1 | 6/2014 | Hirt |
| 8,768,528 B2 | 7/2014 | Millar et al. |
| 8,781,637 B2 | 7/2014 | Eaves |
| 8,787,775 B2 | 7/2014 | Earnshaw |
| 8,829,917 B1 | 9/2014 | Lo |
| 8,836,228 B2 | 9/2014 | Xu |
| 8,842,430 B2 | 9/2014 | Hellriegel |
| 8,849,471 B2 | 9/2014 | Daniel |
| 8,966,747 B2 | 3/2015 | Vinciarelli |
| 9,019,895 B2 | 4/2015 | Li |
| 9,024,473 B2 | 5/2015 | Huff |
| 9,184,795 B2 | 11/2015 | Eaves |
| 9,189,036 B2 | 11/2015 | Ghoshal |
| 9,189,043 B2 | 11/2015 | Vorenkamp |
| 9,273,906 B2 | 3/2016 | Goth |
| 9,319,101 B2 | 4/2016 | Lontka |
| 9,321,362 B2 | 4/2016 | Woo |
| 9,373,963 B2 | 6/2016 | Kuznelsov |
| 9,419,436 B2 | 8/2016 | Eaves et al. |
| 9,510,479 B2 | 11/2016 | Vos |
| 9,531,551 B2 | 12/2016 | Balasubramanian |
| 9,590,811 B2 | 3/2017 | Hunter, Jr. |
| 9,618,714 B2 | 4/2017 | Murray |
| 9,640,998 B2 | 5/2017 | Dawson |
| 9,665,148 B2 | 5/2017 | Hamdi |
| 9,693,244 B2 | 6/2017 | Maruhashi |
| 9,734,940 B1 | 8/2017 | McNutt |
| 9,853,689 B2 | 12/2017 | Eaves |
| 9,874,930 B2 | 1/2018 | Vavilala |
| 9,882,656 B2 | 1/2018 | Sipes, Jr. |
| 9,893,521 B2 | 2/2018 | Eaves |
| 9,948,198 B2 | 4/2018 | Imai |
| 9,979,370 B2 | 5/2018 | Xu |
| 9,985,600 B2 | 5/2018 | Xu |
| 10,007,628 B2 | 6/2018 | Pitigoi-Aron |
| 10,028,417 B2 | 7/2018 | Schmidtke |
| 10,128,764 B1 | 11/2018 | Vinciarelli |
| 10,248,178 B2 | 4/2019 | Brooks |
| 10,263,526 B2 | 4/2019 | Sandusky et al. |
| 10,407,995 B2 | 9/2019 | Moeny |
| 10,439,432 B2 | 10/2019 | Eckhardt |
| 10,468,879 B2 | 11/2019 | Eaves |
| 10,541,543 B2 | 1/2020 | Eaves |
| 10,714,930 B1 | 7/2020 | Weiss et al. |
| 10,735,105 B2 | 8/2020 | Goergen et al. |
| 2001/0024373 A1 | 9/2001 | Cuk |
| 2002/0126967 A1 | 9/2002 | Panak |
| 2004/0000816 A1 | 1/2004 | Khoshnood |
| 2004/0033076 A1 | 2/2004 | Song |
| 2004/0043651 A1 | 3/2004 | Bain |
| 2004/0073703 A1 | 4/2004 | Boucher |
| 2004/0264214 A1 | 12/2004 | Xu |
| 2005/0197018 A1 | 9/2005 | Lord |
| 2005/0268120 A1 | 12/2005 | Schindler |
| 2006/0202109 A1 | 9/2006 | Delcher |
| 2006/0209875 A1 | 9/2006 | Lum |
| 2007/0103168 A1 | 5/2007 | Batten |
| 2007/0236853 A1 | 10/2007 | Crawley |
| 2007/0263675 A1 | 11/2007 | Lum |
| 2007/0284946 A1 | 12/2007 | Robbins |
| 2007/0288125 A1 | 12/2007 | Quaratiello |
| 2008/0052544 A1 | 2/2008 | Hsieh |
| 2008/0198635 A1 | 8/2008 | Hussain |
| 2008/0229120 A1 | 9/2008 | Diab |
| 2008/0310067 A1 | 12/2008 | Diab |
| 2010/0077239 A1 | 3/2010 | Diab |
| 2010/0117808 A1 | 5/2010 | Karam |
| 2010/0171602 A1 | 7/2010 | Kabbara |
| 2010/0190384 A1 | 7/2010 | Lanni |
| 2010/0237846 A1 | 9/2010 | Vetteth |
| 2010/0290190 A1 | 11/2010 | Chester |
| 2011/0004773 A1 | 1/2011 | Hussain |
| 2011/0007664 A1 | 1/2011 | Diab |
| 2011/0083824 A1 | 4/2011 | Rogers |
| 2011/0228578 A1 | 9/2011 | Serpa |
| 2011/0266867 A1 | 12/2011 | Schindler |
| 2011/0290497 A1 | 12/2011 | Stenevik |
| 2012/0064745 A1 | 3/2012 | Ottliczky |
| 2012/0170927 A1 | 7/2012 | Huang |
| 2012/0201089 A1 | 8/2012 | Barth |
| 2012/0231654 A1 | 9/2012 | Conrad |
| 2012/0317426 A1 | 12/2012 | Hunter, Jr. |
| 2012/0319468 A1 | 12/2012 | Schneider |
| 2013/0077923 A1 | 3/2013 | Weem |
| 2013/0079633 A1 | 3/2013 | Weem |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2014/0111180 A1 | 4/2014 | Vladan |
| 2014/0129850 A1 | 5/2014 | Paul |
| 2014/0258742 A1 | 9/2014 | Chien |

(56) References Cited

U.S. PATENT DOCUMENTS

| | | |
|---|---|---|
| 2014/0265550 A1 | 9/2014 | Milligan |
| 2014/0292081 A1 | 10/2014 | Long |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0215001 A1 | 7/2015 | Eaves |
| 2015/0215131 A1 | 7/2015 | Paul |
| 2015/0333918 A1 | 11/2015 | White, III |
| 2015/0340818 A1 | 11/2015 | Scherer |
| 2016/0020911 A1 | 1/2016 | Sipes, Jr. |
| 2016/0064938 A1 | 3/2016 | Balasubramanian |
| 2016/0111877 A1 | 4/2016 | Eaves |
| 2016/0118784 A1 | 4/2016 | Saxena |
| 2016/0133355 A1 | 5/2016 | Glew |
| 2016/0134331 A1 | 5/2016 | Eaves |
| 2016/0142217 A1 | 5/2016 | Gardner |
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo et al. |
| 2016/0294568 A1 | 10/2016 | Chawgo et al. |
| 2016/0308683 A1 | 10/2016 | Pischl |
| 2016/0352535 A1 | 12/2016 | Hiscock |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0155518 A1 | 6/2017 | Yang |
| 2017/0164525 A1 | 6/2017 | Chapel |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello et al. |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec et al. |
| 2019/0267804 A1 | 8/2019 | Matan |
| 2019/0278347 A1 | 9/2019 | Goergen |
| 2019/0280895 A1 | 9/2019 | Mather et al. |
| 2019/0342011 A1 | 11/2019 | Goergen |
| 2022/0190587 A1 | 6/2022 | Eaves et al. |

FOREIGN PATENT DOCUMENTS

| | | |
|---|---|---|
| CN | 204836199 U | 12/2015 |
| CN | 205544597 | 8/2016 |
| CN | 104081237 B | 10/2016 |
| CN | 104412541 B | 5/2019 |
| EP | 1936861 | 6/2008 |
| EP | 2120443 | 11/2009 |
| EP | 2693688 | 2/2014 |
| WO | WO199316407 A1 | 8/1993 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |

OTHER PUBLICATIONS

*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.

"Effects of current on human beings and livestok—Part 1: General aspects," Technical Specification, Basic Safety Publication, IEC/TS 60479-1, Edition 4.0, Jul. 2005, 122 pages.

"Information technology equipment—Safety—Part 1: General requirements," International Standard, IEC 60950-1, Edition 2.2, May 2013, pp. 1-61, 63 pages.

"Information technology equipment—Safety—Part 1: General requirements," International Standard, IEC 60950-1, Edition 2.2, May 2013, pp. 62-122, 61 pages.

"Information technology equipment—Safety—Part 1: General requirements," International Standard, IEC 60950-1, Edition 2.2, May 2013, pp. 123-181, 59 pages.

"Information technology equipment—Safety—Part 1: General requirements," International Standard, IEC 60950-1, Edition 2.2, May 2013, pp. 182-253, 72 pages.

"Information technology equipment—Safety—Part 1: General requirements," International Standard, IEC 60950-1, Edition 2.2, May 2013, pp. 254-319, 66 pages.

"Information technology equipment—Safety—Part 1: General requirements," International Standard, IEC 60950-1, Edition 2.2, May 2013, pp. 320-377, 58 pages.

"Information technology equipment—Safety—Part 1: General requirements," International Standard, IEC 60950-1, Edition 2.2, May 2013, pp. 378-433, 56 pages.

"Information technology equipment—Safety—Part 1: General requirements," International Standard, IEC 60950-1, Edition 2.2, May 2013, pp. 434-490, 57 pages.

"Information technology equipment—Safety—Part 1: General requirements," International Standard, IEC 60950-1, Edition 2.2, May 2013, pp. 491-551, 61 pages.

"Information technology equipment—Safety—Part 1: General requirements," International Standard, IEC 60950-1, Edition 2.2, May 2013, pp. 552-622, 71 pages.

"Information technology equipment—Safety—Part 1: General requirements," International Standard, IEC 60950-1, Edition 2.2, May 2013, pp. 623-644, 24 pages.

"Low-voltage switchgear and controlgear—Part 1: General rules," International Standard, Amendment 2, IEC 60947-1, Edition 5.0, Sep. 2014, pp. 1-63, 65 pages.

"Low-voltage switchgear and controlgear—Part 1: General rules," International Standard, Amendment 2, IEC 60947-1, Edition 5.0, Sep. 2014, pp. 64-102, 41 pages.

Stephen Edelstein, "Updated 2016 Tesla Model S also gets new 75-kWhbattery option," Internet Archive WayBack Machine, Green Car Reports, May 5, 2016, 3 pages.

Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.

"Audio/video, information and communication technology equipment—Part 1: Safety requirements," International Standard, IEC 62368-1, Edition 2.0, Feb. 2014, pp. 1-132, 134 pages.

"Audio/video, information and communication technology equipment—Part 1: Safety requirements," International Standard, IEC 62368-1, Edition 2.0, Feb. 2014, pp. 133-263, 131 pages.

"Audio/video, information and communication technology equipment—Part 1: Safety requirements," International Standard, IEC 62368-1, Edition 2.0, Feb. 2014, pp. 264-387, 124 pages.

"Audio/video, information and communication technology equipment—Part 1: Safety requirements," International Standard, IEC 62368-1, Edition 2.0, Feb. 2014, pp. 388-508, 121 pages.

"Audio/video, information and communication technology equipment—Part 1: Safety requirements," International Standard, IEC 62368-1, Edition 2.0, Feb. 2014, pp. 509-593, 85 pages.

(56) References Cited

OTHER PUBLICATIONS

"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70,2017, 881 pages.
*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.
Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices,", John Wiley & Sons, Inc , 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.
Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog—Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibld=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchlId=3810&recPointer=0&recCount=25&searchType=1&bibld=11348322, retrieved from the Internet Feb. 12, 2021, 4 pages.

Fischer Connectors, "FiberOptic Cable and Connector Solutions," https://www.fischerconnectors.com/us/en/products/fiberoptic, retrieved Dec. 2017, 5 pages.
Strantech, "TGOCA GenX Hybrid 2×2 Fiber Optic—Copper Connector," http://www.strantech.com/products/tfoca-genx-hybrid-2x2-fiber-optic-copper-connector/, retrieved Dec. 2017, 2 pages.
QPC Fiber Optic, "E-Link Hybrid Connector," http://www.qpcfiber.com/product/connectors/e-link-hybrid-connector/, retrieved Dec. 2017, 4 pages.
Lumentum, "Power over Fiber," Technical Note, https://www.lumentum.com/sites/default/files/technical-library-items/poweroverfiber-tn-pv-ae_0.pdf, Jul. 2015, 8 pages.
"Network Remote Power Using Packet Energy Transfer", Eaves et al., www.voltserver.com, Sep. 2012.
Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.
Implementation Guide, "Virtual Chassis Technology Best Practices", Juniper Networks, 8010018-009-EN, Jan. 2016, https://wwwjuniper.net/us/en/local/pdf/implementation-guides/8010018-en.pdf, 29 pages.
Yencheck, Thermal Modeling of Portable Power Cables, 1993.
Zhang, Machine Learning-Based Temperature Prediction for Runtime Thermal Management across System Components, Mar. 2016.
Ashrae, "Data Center Power Equipment Thermal Guidelines and Best Practices," ASHRAE TC9.9, Jun. 2016, 60 pages.
Dynamic Thermal Rating of Substation Terminal Equipment by Rambabu Adapa, 2004.
Chen, Real-Time Termperature Estimation for Power MOSFETs Conidering Thermal Aging Effects:, IEEE Trnasactions on Device and Materials Reliability, vol. 14, No. 1, Mar. 2014.
Jingquan Chen et al: "Buck-boost PWM converters having two independently controlled switches", 32nd Annual IEEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2,Jun. 17, 2001 (Jun. 17, 2001), pp. 736-741, XP010559317, DOI: 10.1109/PESC.2001.954206, ISBN 978-0-7803-7067-8 paragraph [Section 11]; figure 3.
Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.
Petition for Post Grant Review of U.S. Pat. No. 10,735,105 [Public] and exhibits, filed Feb. 16, 2021, PGR 2021-00055, 132 pages.
Petition for Post Grant Review of U.S. Pat. No. 10,735,105 [Public] and exhibits, filed Feb. 16, 2021, PGR 2021-00056, 116 pages.
Eaves, S. S., Network Remote Powering Using Packet Energy Transfer, Proceedings of IEEE International Conference on Telecommunications Energy (INTELEC) 2012, Scottsdale, AZ, Sep. 30-Oct. 4, 2012 (IEEE 2012) ("EavesIEEE").
Edelstein S., Updated 2016 Tesla Model S also gets new 75-kWh battery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein"), 3 pages.
NFPA 70 National Electrical Code, 2017 Edition (NEC).
International Standard IEC 62368-1 Edition 2.0 (2014), ISBN 978-2-8322-1405-3 ("IEC-62368").
International Standard IEC/TS 60479-1 Edition 4.0 (2005), ISBN 2-8318-8096-3 ("IEC-60479").
International Standard IEC 60950-1 Edition 2.2 (2013), ISBN 978-2-8322-0820-5 ("IEC-60950").
International Standard IEC 60947-1 Edition 5.0 (2014), ISBN 978-2-8322-1798-6 ("IEC-60947").
Tanenbaum, A. S., Computer Networks, Third Edition (1996) ("Tanenbaum"), Jan. 1996, 12 pages.
Stallings, W., Data and Computer Communications, Fourth Edition (1994) ("Stallings"), 14 pages.
Alexander, C. K., Fundamentals of Electric Circuits, Indian Edition (2013) ("Alexander").

(56) References Cited

OTHER PUBLICATIONS

Hall, S. H., High-Speed Digital System Design, A Handbook of Interconnect Theory and Design Practices (2000) ("Hall"), Sep. 2000, 55 pages.
Sedra, A. S., Microelectronic Circuits, Seventh Edition (2014) ("Sedra").
Lathi, B. P., Modern Digital and Analog Communication Systems, Fourth Edition (2009) ("Lathi").
Understanding 802.3at PoE Plus Standard Increases Available Power (Jun. 2011) ("Microsemi").

METHOD AND SYSTEM FOR INTEGRATION AND CONTROL OF POWER FOR CONSUMER POWER CIRCUITS

STATEMENT OF RELATED APPLICATION

The present application is a continuation of U.S. patent application Ser. No. 17/367,744, entitled METHOD AND SYSTEM FOR INTEGRATION AND CONTROL OF POWER FOR CONSUMER POWER CIRCUITS, filed Jul. 6, 2021, which is a continuation of U.S. patent application Ser. No. 16/746,500, entitled METHOD AND SYSTEM FOR INTEGRATION AND CONTROL OF POWER FOR CONSUMER POWER CIRCUITS, filed Jan. 17, 2020, now U.S. Pat. No. 11,088,547, issued Aug. 10, 2021. The content of these applications is incorporated herein by reference in its entirety.

TECHNICAL FIELD

The present disclosure relates generally to power systems, and more particularly, to integration and control of power circuits for consumers power circuits.

BACKGROUND

There is a growing demand to update conventional power systems in homes and businesses. Safety issues with conventional AC power continue to exist. New homes in California will soon require the inclusion of solar power systems; however, significant challenges in efficiently implementing renewable energy systems in houses and building circuitry remain. Integration and allocation of renewable energy and new safer power systems, along with conventional AC power will create a number of challenges.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
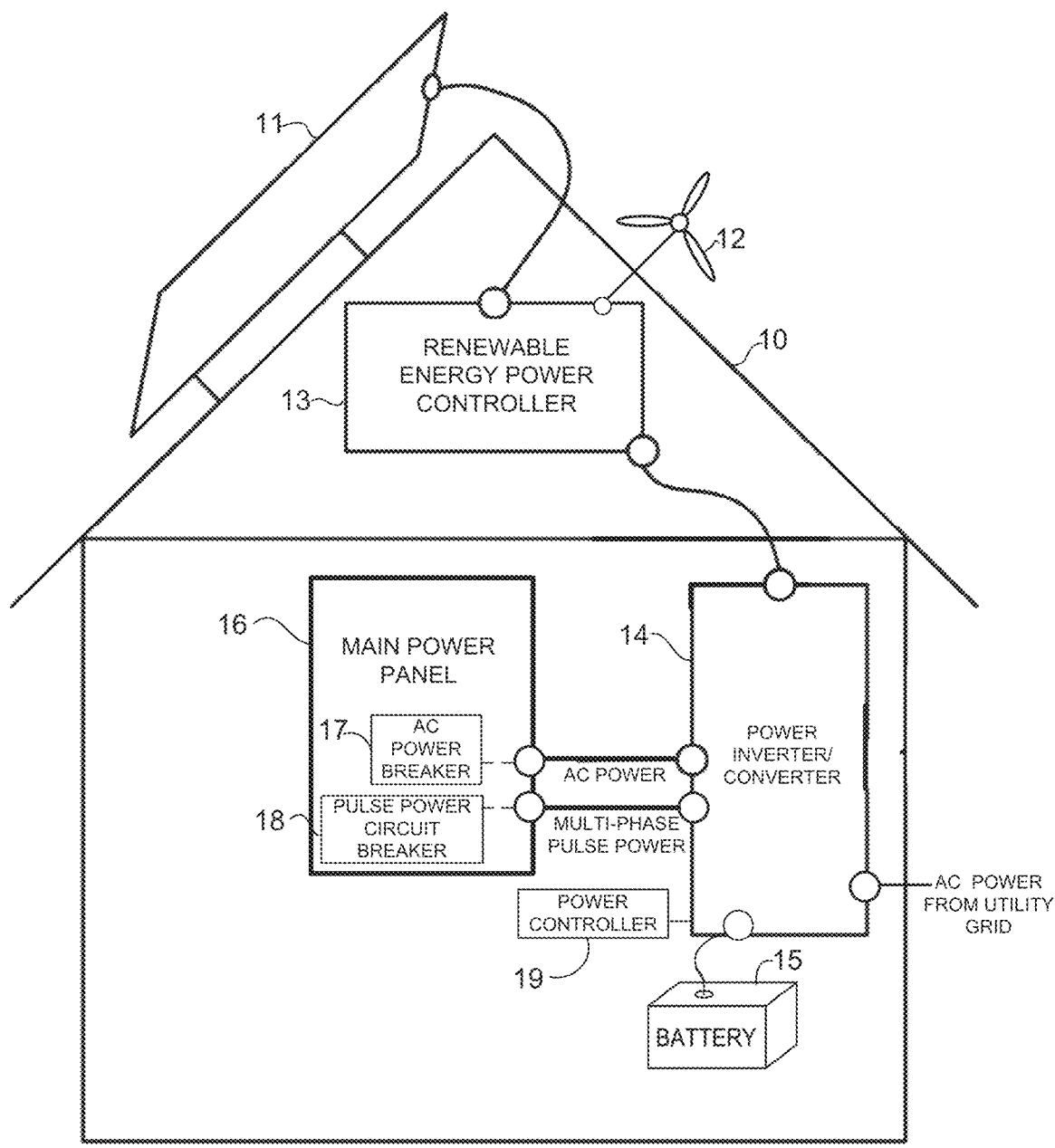
FIG. 1 is a block diagram illustrating integration of renewable energy, AC power, and DC power at a consumer power panel, in accordance with one embodiment.

In one embodiment, a power distribution system generally comprises a DC power input for receiving DC power from a renewable energy source, an AC power input for receiving AC power, a multi-phase pulse power output for transmitting multi-phase pulse power, an AC power output for transmitting the AC power, and a controller for allocating power to the multi-phase pulse power output and the AC power output.

In one or more embodiments, the multi-phase pulse power and the AC power are delivered to power circuitry in a building for powering end devices and data is delivered with the multi-phase pulse power to one or more of the end devices.

In one or more embodiments, the multi-phase pulse power is delivered to an outlet operable to deliver the multi-phase pulse power or PoE (Power over Ethernet).

In one or more embodiments, the system further comprises an Ethernet power controller in communication with a DC bus receiving the DC power from the renewable energy source and from an AC to DC converter at the AC power input.

In one or more embodiments, the system further comprises a controller operable to allocate output of the DC power to the multi-phase pulse power output based on a load requirement of end devices.

In one or more embodiments, the system further comprises a controller operable to monitor power usage and turn off one or more low priority power circuits when power load exceeds available power.

In one or more embodiments, the controller is operable to turn off the low priority power circuits when the power load exceeds power available from the renewable energy source.

In one or more embodiments, the DC power is integrated at a 380 VDC bus.

In one or more embodiments, the multi-phase pulse power comprises three-phase pulse power at a voltage greater than 56 volts DC.

In one or more embodiments, the renewable energy source comprises at least one of a solar panel, a wind turbine, and a rechargeable battery.

In another embodiment, an apparatus generally comprises an AC circuit breaker, a renewable energy circuit breaker, a multi-phase pulse power circuit breaker, and a switch coupled to the multi-phase pulse power circuit breaker and operable to provide circuit breaker control.

In another embodiment, a method generally comprises receiving AC power, receiving DC power from a renewable energy source, integrating the AC power and the DC power at a power distribution system, monitoring available power and power load, transmitting the AC power, and transmitting multi-phase pulse power comprising a plurality of phases of pulse power, wherein the pulse power comprises a plurality of DC voltage pulses with the DC voltage pulses offset between phases to provide continuous power.

In yet another embodiment, an apparatus generally comprises an input for receiving DC power from a renewable energy source, an output for transmitting multi-phase pulse power and PoE, and a controller for monitoring available power, identifying one or more low priority power circuits, and disabling the low priority power circuits when a power load exceeds the available power.

Further understanding of the features and advantages of the embodiments described herein may be realized by reference to the remaining portions of the specification and the attached drawings.

Example Embodiments

The following description is presented to enable one of ordinary skill in the art to make and use the embodiments.

Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Conventional consumer power transmission has been dominated by AC (alternating current) power transmission. However, requirements in the production and consumption of energy along with environmental and conservation concerns are leading to changes in power provision and control in consumer power. For example, there has been a growing increase in consumers adding renewable energy sources locally to produce power. California will soon require new homes to have solar power systems and other states may soon follow. Solar power systems provide power directly into an electrical grid at maximum output capacity. When the electrical grid is in an 'off' state, power from the solar system is lost. In some cases, there may be a battery backup and the solar power may be used to charge the battery, however, this type of system is typically inefficient and rarely deployed.

Most wind, solar, and battery systems for residential use comprise 380 VDC (volts direct current) based systems. Most electrical devices in a home can run on 240 VAC (volts alternating current) or 380 VDC with minimal to no effort, and little change in efficiency. Renewable energy technologies have potential to reduce conversion loss as they produce DC output directly negating losses from inverting to AC if they can be connected directly to suitable end loads. However, significant challenges in physically implementing renewable energy solutions in houses and building power circuitry remain. Continued focus on renewable energy systems is driving a need for a managed main circuit panel with integrated wired data along with power allocation so that prioritized circuits can continue to operate as wind, solar, and battery power decrease or increase over a twenty-four hour period, rather than shutting down the system for lack of power supplied.

In addition to the need for integration of renewable energy sources, conventional AC power systems continue to cause safety issues. While there have been improvements that have made delivery of AC power safer over the years, safety concerns still exist with conventional AC power in residential homes.

The embodiments described herein provide a consumer power system that integrates renewable energy sources and safe higher power DC systems with conventional AC power along with power monitoring and data control to provide a system that is safer and interoperable with renewable energy input sources. In one or more embodiments, power sources are integrated at a main power panel along with power allocation so that power may be provided to prioritized circuits if power demand exceeds available power. Power sources may include, for example, renewable energy power sources (e.g., solar panel, wind turbine, rechargeable battery) and AC power from a utility grid. The power system may distribute AC power, PoE (Power over Ethernet), and ESP (Extended Safe Power). PoE and ESP may be used to supply power and data over an Ethernet cable. Power may be carried on the same conductors that carry data or power may be carried on dedicated conductors within the same cable or separate cables. While PoE is generally limited to low power applications (e.g., ≤100 Watts (W)), ESP provides higher power with built in safety.

The term "Extended Safe Power" ("ESP") as used herein refers to high power (e.g., >100 Watts (W)), high voltage (e.g., ≥56 Volts (V)) operation with pulse power delivered on one or more wires or wire pairs in a cable (e.g., Ethernet cable). In one or more embodiments, ESP includes fault detection (e.g., fault detection at initialization and between high voltage pulses), and pulse synchronization. Power is delivered from power sourcing equipment (PSE) (e.g., power source at a main power panel in a consumer premise (e.g., residential, business, or other building)) to a powered device (PD) (end device, electrical device (e.g., computer, laptop, tablet, phone, security system, camera, consumer device, portable electronics, light, lighting system, and the like)), with the power distributed over consumer power circuits within the building. The power may be transmitted with communications (e.g., bidirectional communications) or without communications.

The term "pulse power" (or "pulsed power") as used herein refers to power that is delivered in a sequence of pulses (alternating low direct current voltage state and high direct current voltage state) in which the voltage varies between a very small voltage (e.g., close to 0V, 3 VDC) during a pulse-off interval and a larger voltage (e.g., ≥12 VDC, ≥24 VDC) during a pulse-on interval. High voltage pulse power (e.g., ≥56 VDC, ≥60 VDC, ≥300 VDC, ~108 VDC, ~380 VDC) may be transmitted from power sourcing equipment to a powered device for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety. Pulse power transmission may be through cables, transmission lines, bus bars, and power distribution systems, for example.

In one or more embodiments, ESP may comprise pulse power transmitted in multiple phases in a multi-phase pulse power system with pulses offset from one another between wires or wire pairs to provide continuous power, as described below with respect to FIGS. 6A and 6B. One or more embodiments may use multi-phase pulse power to achieve less loss, with continuous uninterrupted power with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety.

Referring now to the drawings, and first to FIG. 1, a schematic illustrating renewable energy integrated at a main power panel in consumer power circuitry is shown, in accordance with one embodiment. The consumer power system described herein may be implemented in any type of building 10 (e.g., residential, business, industrial, hotel, apartment, school and the like). In the simplified example shown in FIG. 1, the building 10 is configured with renewable energy sources comprising a solar panel 11, a wind turbine 12, and a rechargeable battery 15. The solar and wind systems 11, 12 are coupled to the power circuit through an interface (e.g., renewable energy source power controller) 13. A power distribution system (power inverter/converter) 14 receives input from the power interface 13 and is also coupled to the rechargeable battery (or other energy storage device) 15. As described in detail below, the power inverter/converter 14 also receives AC power from a utility grid. The power distribution system 14 provides AC power and multi-phase pulse power to a main power panel 16 comprising AC power breaker 17 and pulse power circuit breaker 18. As described below, the circuit breaker may be a physical disconnect or electronically controlled. A power controller 19 monitors and controls power distribution with wired data integrated into the power distribution system. The main power panel 16 may be located at any suitable location within the building (e.g., garage, basement, adjacent to exterior wall near electrical power input). The main power panel 16 distributes power throughout the building to any number of outlets or end point devices (loads) (not shown), which consume power (e.g., lighting, computer equipment, entertainment devices, HVAC (heating, ventilation, and air conditioning) equipment, household and kitchen appliances, electrical vehicle charger, or any other device that requires electricity to operate).

It is to be understood that the consumer power system shown in FIG. 1 is only an example, and the system may include additional components, fewer components, or different components, without departing from the scope of the embodiments. For example, the building 10 may only be configured with one of the renewable energy sources shown.

Figure 2:
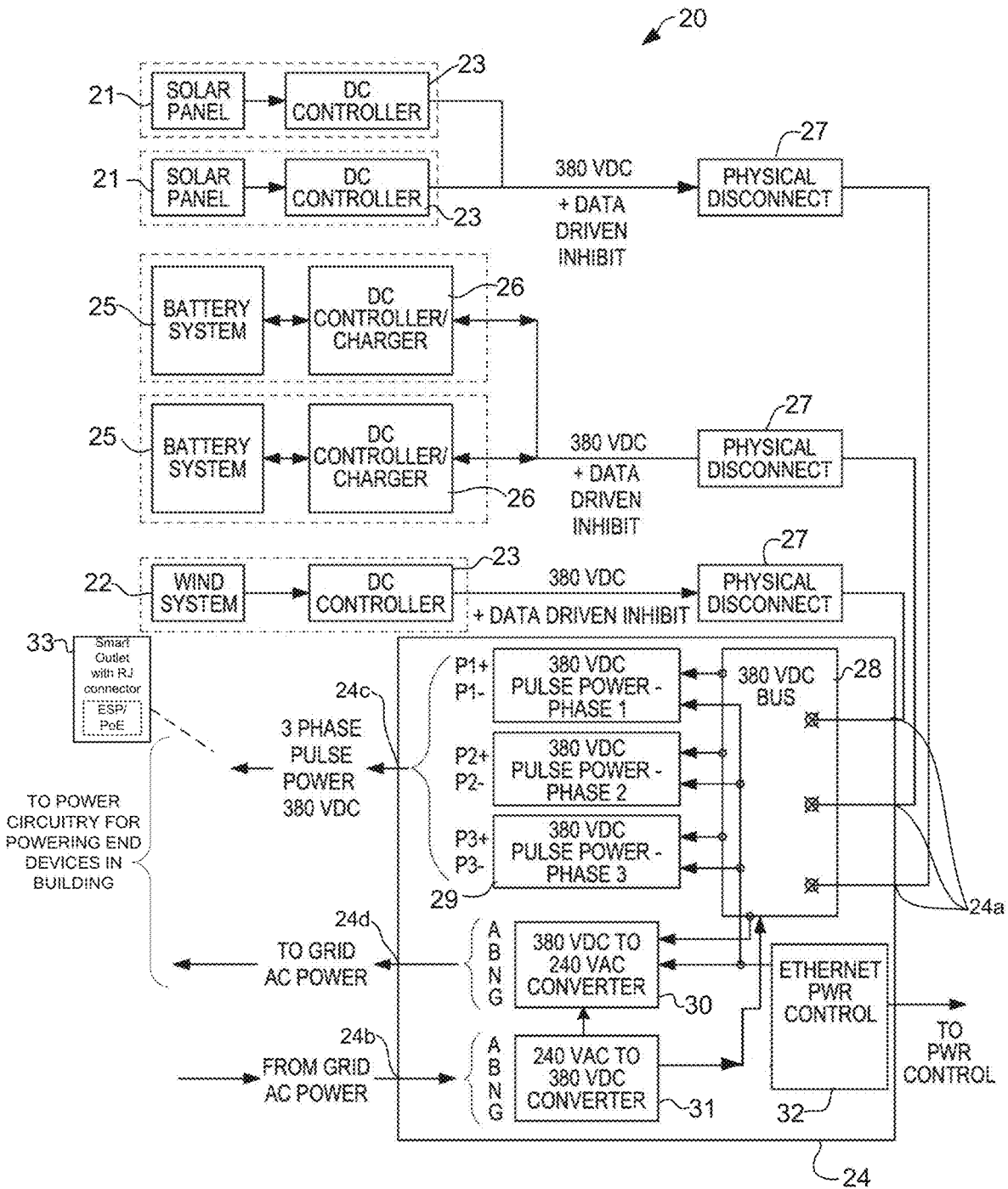
FIG. 2 is a block diagram illustrating details of a consumer power system, in accordance with one embodiment.

FIG. 2 illustrates details of the consumer power system shown in FIG. 1, in accordance with one embodiment. Power system 20 shown in FIG. 2 includes renewable energy sources comprising solar panels 21, wind system 22, and battery systems 25. In one or more embodiments, a power distribution system 24 comprises one or more DC power inputs 24*a* for receiving DC power from one or more renewable energy sources (e.g., solar panel 21, wind system 22, battery system 25), an AC power input 24*b* for receiving AC power, a multi-phase pulse power output 24*c* for transmitting multi-phase pulse power (or multi-phase pulse power and PoE), AC power output 24*d* for transmitting the AC power, and a controller 32 for allocating power to the multi-phase pulse power output and the AC power output.

As shown in the example of FIG. 2, the system comprises a DC power module (bus) 28 for receiving input from the renewable energy source (solar panel 21, wind system 22, chargeable battery system 25) and the AC power source (e.g., utility grid power input at an AC power module 31 (AC to DC converter), a multi-phase pulse power system (DC pulse power phase modules) 29 for receiving DC power from the DC bus 28 and delivering multi-phase DC pulse power, and an AC power module 30 (DC to AC inverter) (FIG. 2). The received AC power is converted to DC power at module 31, integrated with the DC power from the renewable energy sources 21, 22, 25, and allocated for transmittal as the multi-phase pulse power. AC power received from the electrical grid at 24*b* may also be sent directly to AC power output 24*d* without conversion (e.g., directly from power module 31 to power module 30), for delivery of AC power to power AC end devices in the building or providing power back to the electrical grid. As previously described, the multi-phase DC pulse power and the AC power are delivered to power circuitry for powering end devices (electrical devices) in the building.

The solar panel 21 and wind system 22 are coupled to DC controllers 23 and the battery is coupled to a DC controller/charger 26. The battery system 25 may receive DC power from the power distribution system 24 to charge the battery, and transmit DC power to the power distribution system as needed. The solar panel 21, wind system 22, and battery system 25 are coupled to the power distribution system 24 through physical disconnects (circuit breakers) 27 and may also be configured to transmit or receive data (at the DC controller 23, 26) including a data driven inhibit signal (electrical disconnect).

In the example shown in FIG. 2, the bus 28 comprises a 380 VDC bus, the inverter 30 is configured for converting 380 VDC to 240 VAC, the converter 31 is configured to convert 240 VAC to 380 VDC, and the pulse power is delivered with high voltage pulses of 380 VDC. The AC power modules 30, 31 are configured with circuits A and B, along with neutral (N) and ground (G). It is to be understood that the circuits and voltages shown in FIG. 2 are provided as an example and other voltages may be used, without departing from the scope of the embodiments.

The power controller 32 may comprise an Ethernet power controller coupled to the bus 28, pulse power phase modules 29, and inverter 30 for monitoring and controlling power delivery. The power controller 32 may, for example, control the system to dynamically integrate or convert the available power supplies based on the overall current or expected usage load level of the end devices. As described below, a prioritization and control algorithm may be used to turn off lower priority circuits during times of low power input from the renewable energy sources 21, 22, 25.

The building may include, for example, conventional AC outlets along with DC outlets that may be configured to provide variable or suitable voltage levels to end devices. For example, the building may include any number of outlets 33 (e.g., RJ45 or other Ethernet connector or receptacle suitable for delivering power and transmitting or receiving data) configured with smart detection to switch between PoE (e.g., 90 W) and ESP (e.g., >100 W) based on power requirement or capability of the end device plugged into the outlet.

As previously described, the renewable energy systems are integrated into a consumer power main circuit breaker along with PoE, pulse power, and power control. The circuit breaker may be configured for connection to pulse power or PoE depending on the particular circuit requirements. In one or more embodiments, a circuit breaker system includes an AC circuit breaker 34, a renewable energy circuit breaker 35, a multi-phase pulse power circuit breaker 36, and a switch 41 coupled to the multi-phase pulse power circuit breaker and operable to provide circuit breaker control (FIG. 3).

Figure 3:
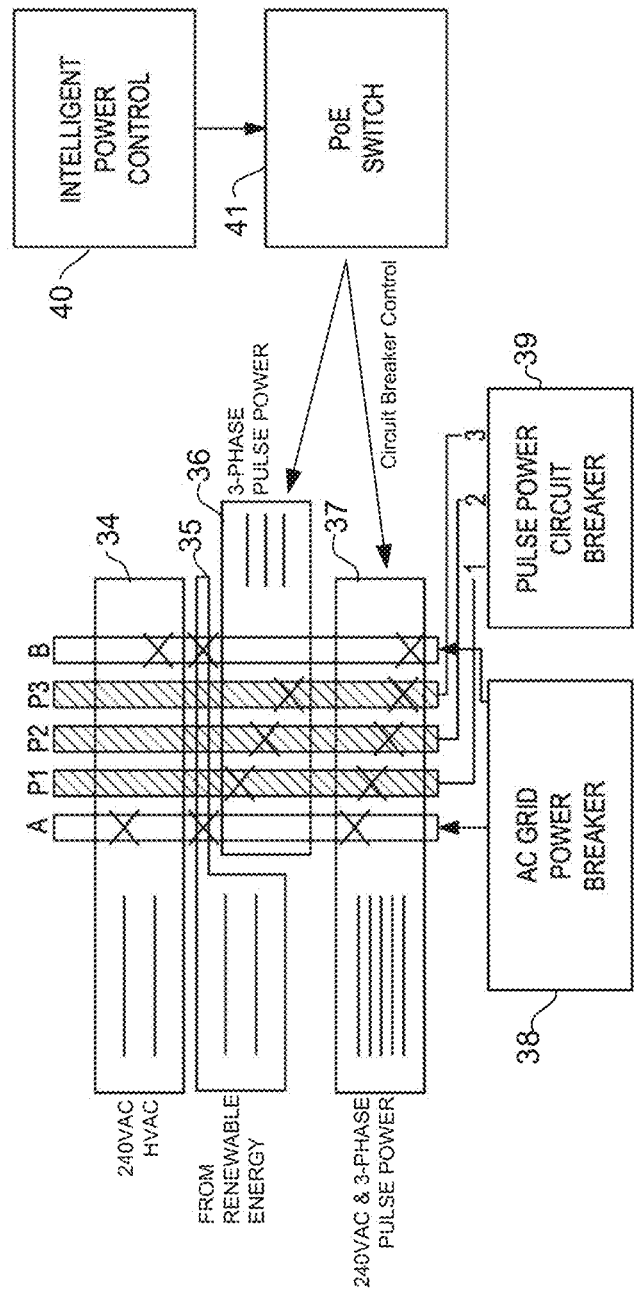
FIG. 3 is a block diagram illustrating a circuit breaker panel for the consumer power system, in accordance with one embodiment.

The system shown in the example of FIG. 3 includes four circuit breakers; 240 VDC HVAC circuit breaker 34, renewable energy circuit breaker 35, multi-phase pulse power circuit breaker 36, and AC/multi-phase pulse power circuit breaker 37. An AC grid power breaker 38 is coupled to AC circuits A and B and a pulse power circuit breaker 39 is coupled to phases P1, P2, and P3 (e.g., at bus bars A, P1, P2, P3, B in FIG. 3). Intelligent power control 40 provides input to the PoE switch 41, which provides electrical circuit breaker control to the pulse power circuit breakers 36 and 37. Manual input (physical disconnect) may be provided for circuit breakers 34 35, and 37, while the multi-phase pulse power circuit breaker 36 may only have an electrically controlled disconnect.

It is to be understood that the circuit breaker system shown in FIG. 3 is only an example and components, circuits, or circuit breakers may be added or modified without departing from the scope of the embodiments. For example, three phases of pulse power are shown in FIG. 3, but any number of phases may be used. In one example, four phases of pulse power may be used (e.g., on four-pair cat 5/6 cable) with a P4 bus added to the system. In another example, a 120 VAC circuit breaker may be used with three-phases of pulse power.

Figure 4:
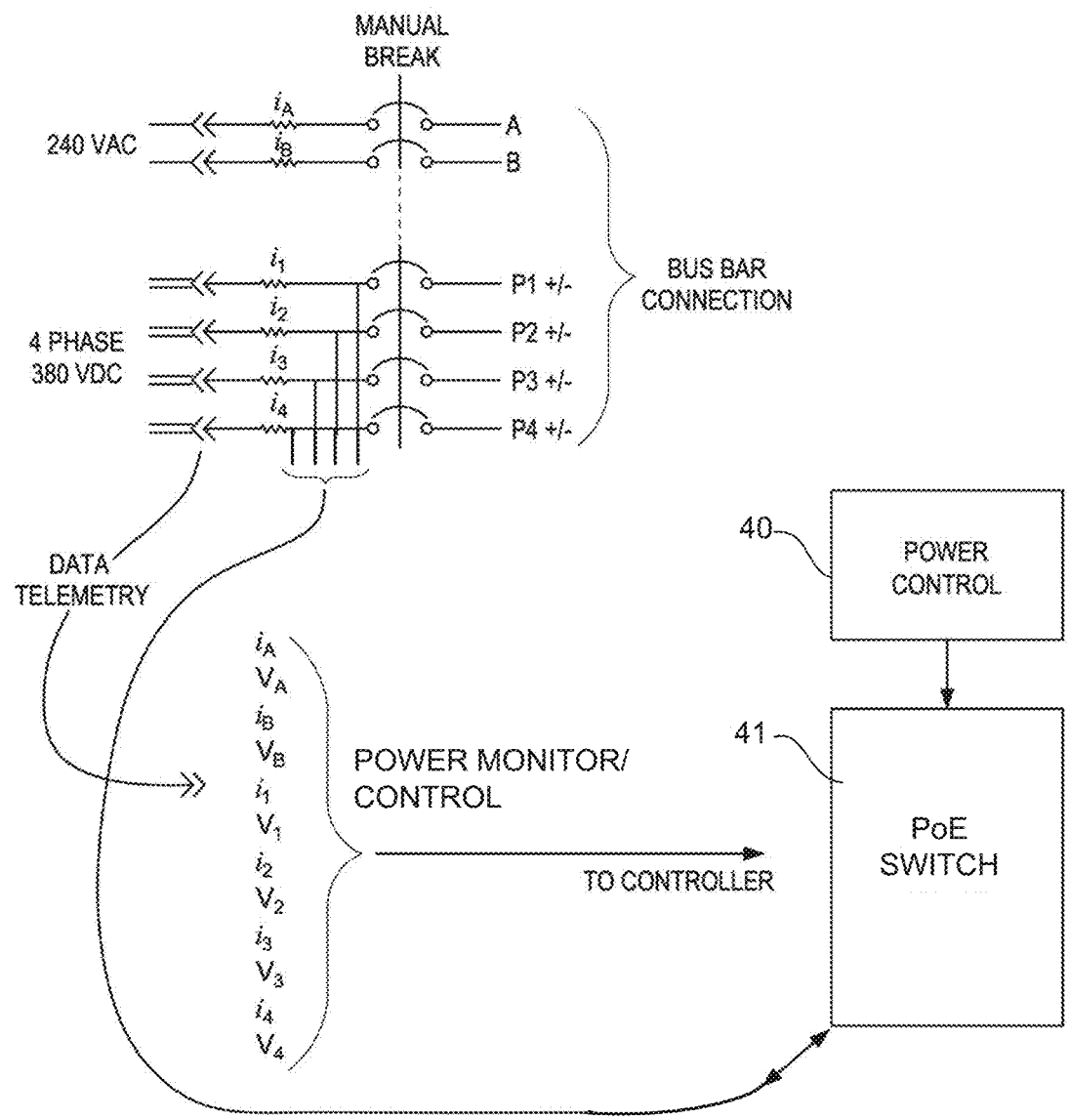
FIG. 4 illustrates a four-phase pulse power circuit breaker, in accordance with one embodiment.

FIG. 4 illustrates an example of a four-phase pulse power circuit breaker with power monitoring and control, in accordance with one embodiment. In the example shown in FIG. 4, the power controller 40 provides input to the PoE switch 41, which is in communication with the four phases. A manual breaker is provided for the AC circuits A and B (currents $i_A$, $i_B$), which have a bus bar connection to the four phases ($P_1$, $P_2$, $P_3$, $P_4$ (currents $i_1$, $i_2$, $i_3$, $i_4$)). Data telemetry provides power monitor and control with input of the currents and corresponding voltages to the power controller 40 at the PoE switch 41. The power control breaker for the four phases may use an electrical pull and may have, for example, FET (Field Effect Transistor) control with switches between pulse power and PoE.

Figure 5:
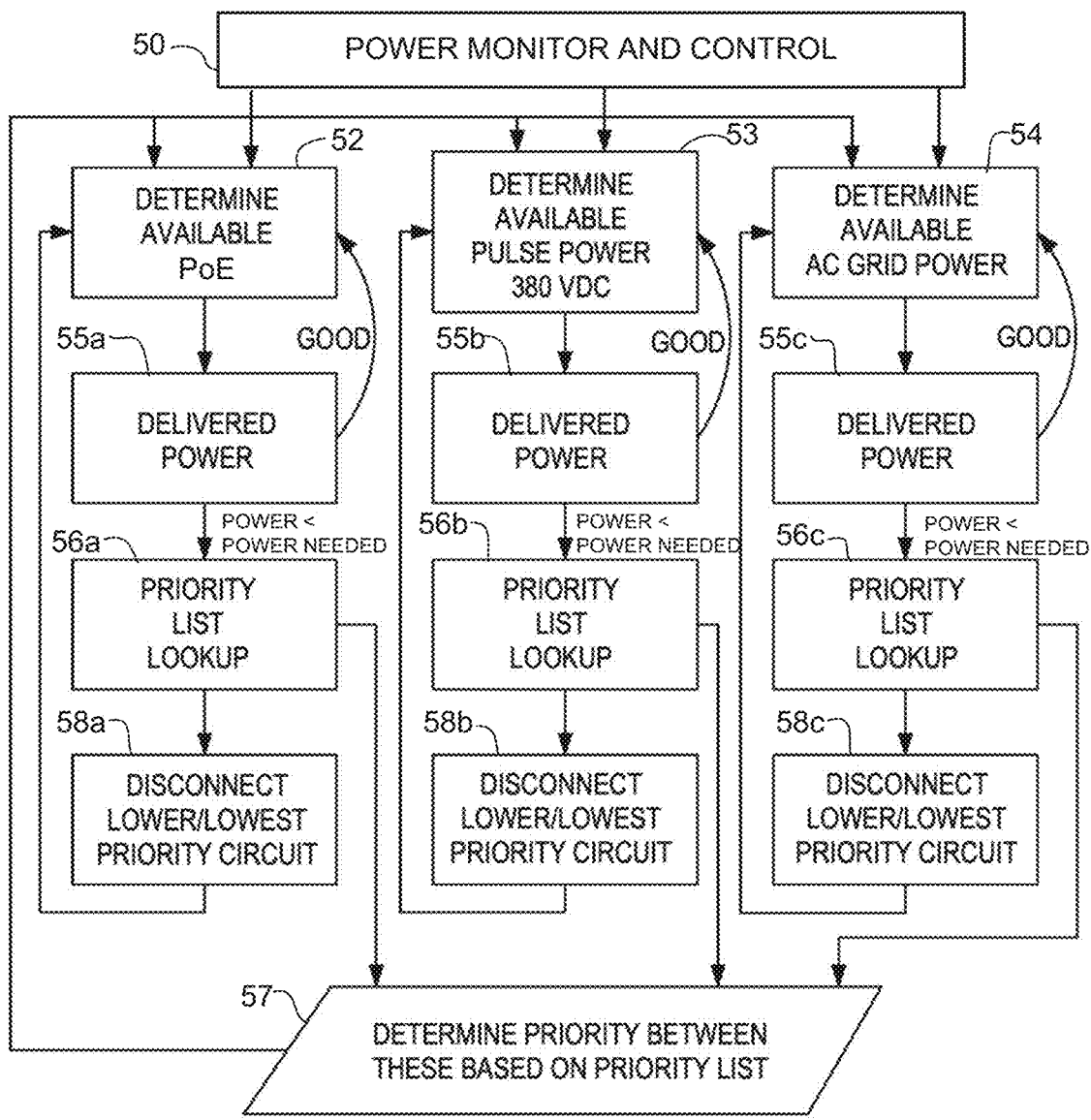
FIG. 5 is a process flowchart illustrating monitoring and control of power distribution with prioritization between circuits, in accordance with one embodiment.

FIG. 5 illustrates an example of power monitor and control, in accordance with one embodiment. Power monitor and control 50 (e.g., from power controller 40 and switch 41 in FIGS. 3 and 4) determine available PoE 52, pulse power 53, and AC grid power 54. If sufficient power is available, power is delivered at 55a, 55b, 55c. If sufficient power is not available (power<power needed), a lookup is performed at a priority list at 56a, 56b, or 56c. Priority is determined between the circuits based on a priority list (step 57) and one or more lower priority circuits are disconnected at 58a, 58b, or 58c, as needed. Peak energy requirements may be balanced, for example, by turning off systems (e.g., HVAC) that have been allocated as low priority to prevent the need to have additional capacity built in for peak usage.

In one or more embodiments, a prioritization and control algorithm may be implemented so that as renewable energy sources dwindle (e.g., in a twenty-four hour period), appropriate prioritization may be applied to keep select circuits active, while inhibiting others. For example, it may be important to maintain power at a refrigerator and security camera, while power to kitchen lighting and ceiling fans may be turned off. A percentage of power may be disabled and reallocated elsewhere during downward trends in solar or wind energy, for example, thereby significantly preserving battery life.

As previously described, power delivered by the power distribution system may comprise high voltage pulse power or high voltage multi-phase pulse power (high voltage DC power). The multi-phase pulse power comprises a plurality of phases of pulse power, with the pulse power comprising a plurality of DC voltage pulses with the DC voltage pulses offset between phases to provide continuous power. FIGS. 6A and 6B schematically illustrate simplified examples of voltage and current in a two-phase and three-phase pulse power system, respectively.

Figure 6A:
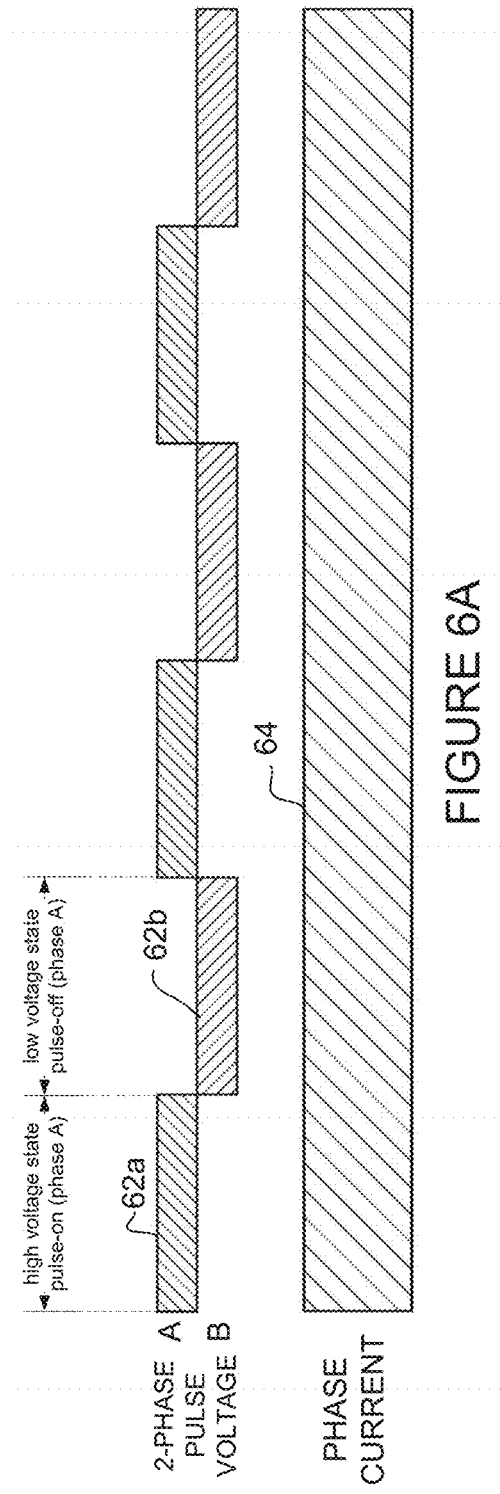
FIG. 6A illustrates a simplified example of voltage and current for a two-phase pulse power system, in accordance with one embodiment.

Referring first to FIG. 6A, voltage for phase A is shown at 62a and voltage for phase B is shown at 62b. The continuous phase current is shown at 64. The pulse power for each phase comprises a plurality of voltage pulses defining alternating high voltage states and low voltage states. As shown in FIG. 6A, the voltage is switched between a pulse on-time (e.g., voltage >24 VDC, voltage ≥60 VDC, voltage ≥380) and a pulse off-time (e.g., voltage <12V, ≤24V). During pulse-on time, high voltage power is delivered and during pulse-off time while the high voltage power is off, a low voltage may be applied on each phase for use in low voltage sensing to check wire integrity, test capacitance in the cable, or any other testing or fault detection. The voltage pulses are offset between phases to provide continuous power.

Figure 6B:
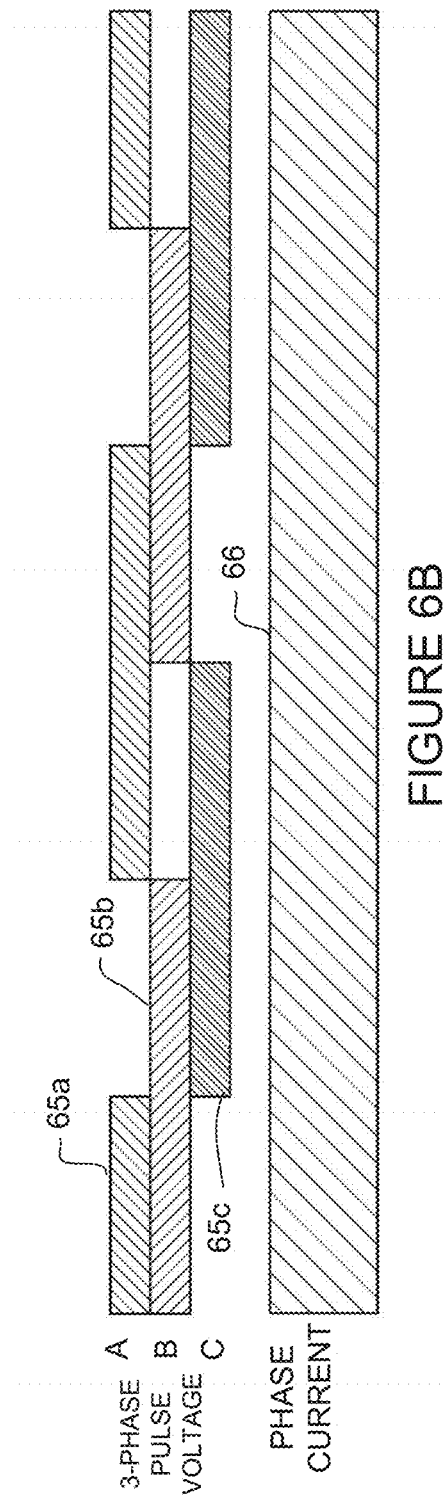
FIG. 6B illustrates a simplified example of voltage and current for a three-phase pulse power system, in accordance with one embodiment.

In the three-phase system of FIG. 6B, voltage for phase A is shown at 65a, voltage for phase B is shown at 65b, and voltage for phase C is shown at 65c. The continuous phase current is shown at 66.

It is to be understood that the voltages, currents, and duty cycles shown in FIGS. 6A and 6B illustrate simplified examples with idealized waveforms. In one or more embodiments, the voltage during off-time is greater than zero for use in fault detection, as previously noted. For example, the voltage during pulse-off time may comprise a low voltage to provide for fault sensing during pulse-off time. Fault sensing may include, for example, line-to-line fault detection with low voltage sensing of the cable or powered device and line-to-ground fault detection with midpoint grounding. These power safety features provide for safe system operation and installation and removal (disconnect) of devices.

In one or more embodiments, the pulse-on time is greater than the pulse-off time. For example, the high voltage may be pulsed on for 4 ms and off for 1 ms. In another example, the high voltage may be pulsed on for 8 ms and off for 4 ms. Also, the voltage pulse-on times may overlap between phases so that at least one wire is on at any time, as shown in FIG. 6B. During phase overlap in the multi-phase system, the total cable current is shared across all ON wires. When the phases are combined at the powered device, the result is continuous DC voltage as shown by the phase current 64 and 66. As described in U.S. patent application Ser. No. 16/380, 954, referenced above, the multi-phase system may comprise any number of phases, with any phase offset or overlap, or duty cycle.

Figure 7:
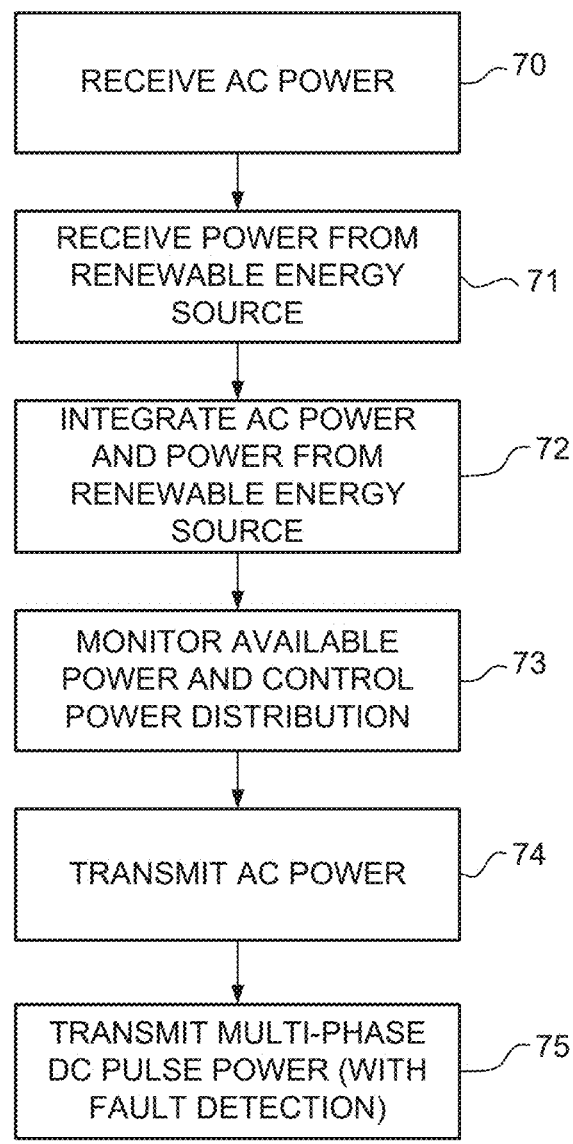
FIG. 7 is a flowchart illustrating an overview of a process for integrating power sources and controlling power distribution, in accordance with one embodiment.

FIG. 7 is a flowchart illustrating an overview of a process for integrating power sources and controlling power distribution in building power circuitry, in accordance with one embodiment. At step 70, AC power is received from a utility grid. Power is also received from renewable energy sources (e.g., solar panel, wind system, rechargeable battery) (step 71). The received power is integrated (step 72). For example, the AC power may be converted to DC power and input at a DC bus, as previously described. Available power is monitored and power is distributed (step 73). The power distribution may be controlled, for example, by turning off one or more low priority circuits if sufficient power is not available to meet all power demands. Power distribution may include, for example, transmitting AC power (step 74) and transmitting multi-phase DC pulse power (step 75) to power circuitry. As described above with respect to FIGS. 6A and 6B, fault detection may be performed on the multi-phase pulse power between high voltage pulses.

It is to be understood that the process shown in FIG. 7 and described above is only an example and steps may be added, modified, or combined without departing from the scope of the embodiments.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:
1. A power system comprising:
   a power panel operable to distribute alternating current (AC) power and pulse power to a plurality of power outlets and comprising an AC circuit breaker and a pulse power circuit breaker, the pulse power compris- ing a sequence of pulses alternating between a low direct current (DC) power state and a high DC power state;
a power inverter and converter coupled to the power panel through an AC power connection and a pulse power connection and comprising:
a DC power input for receiving DC power from a renewable energy source;
an AC power input for receiving AC power; and
a connection to an energy storage device; and
a power controller in communication with the power inverter and converter and operable to balance power load and allocate power received at the DC power input and the AC power input to the power panel.

2. The power system of claim 1, wherein the pulse power connection is operable to transmit multi-phase pulse power in which pulses are offset from between phases to provide continuous power.

3. The power system of claim 2, wherein the multi-phase pulse power is delivered to one or more of a plurality of outlets operable to deliver the multi-phase pulse power or PoE (Power over Ethernet).

4. The power system of claim 1, wherein the power controller is operable to allocate output of the DC power to the pulse power connection based on a load requirement of end devices.

5. The power system of claim 1, wherein the power controller is operable to monitor power usage and turn off one or more low priority power circuits when the power load exceeds available power.

6. The power system of claim 5, wherein the power controller is operable to turn off said one or more low priority power circuits when the power load exceeds power available from the renewable energy source.

7. The power system of claim 1, wherein the power inverter and converter is configured to convert 380 volts DC to 240 volts AC and convert 240 volts AC to 380 volts DC as needed based on a current or expected usage load level of end devices.

8. The power system of claim 7, wherein the pulse power is delivered with high voltage pulses of 380 volts DC.

9. The power system of claim 1, wherein the pulse power comprises fault detection at initialization and between high power pulses and pulse synchronization between a main power panel and a powered device.

10. The power system of claim 1, wherein the pulse power is transmitted with bidirectional communications.

11. An apparatus comprising:
a pulse power circuit breaker that is configured to produce pulse power comprising a sequence of pulses alternating between a low direct current (DC) power state and a high DC power state with pulses offset to provide continuous power;
a Power over Ethernet (PoE) switch in communication with the pulse power; and
a power controller for control of the PoE switch, the power controller comprising a circuit priority list;
wherein current and/or voltage are monitored and input to the power controller and wherein the power controller is operable to direct the PoE switch to disconnect one or more low priority circuits if sufficient power is not available.

12. The apparatus of claim 11, further comprising an alternating current (AC) power breaker.

13. The apparatus of claim 11, further comprising a combined alternating current (AC) and multi-phase pulse power circuit breaker.

14. The apparatus of claim 11, wherein the PoE switch is operable to receive voltage and current information for AC power circuits.

15. The apparatus of claim 11, wherein the pulse power circuit breaker outputs multi-phase pulse power, further comprising a manual circuit breaker for alternating current (AC) power circuits with a bus bar connection to each phase of the multi-phase pulse power.

16. The apparatus of claim 15, wherein the multi-phase pulse power comprises four phases and further comprising an alternating current (AC) circuit breaker for control of at least two AC power circuits.

17. A method comprising:
receiving direct current (DC) power from a renewable energy source;
converting the DC power to pulse power comprising a sequence of pulses alternating between a low DC power state and a high DC power state with pulses offset between to provide continuous power;
transmitting the pulse power to a power panel;
distributing the pulse power from the power panel to a plurality of power circuits for powering end devices at a plurality of power outlets;
monitoring the pulse power and a power load at a controller comprising a circuit priority list; and
disabling one or more low priority power circuits when the power load exceeds available pulse power.

18. The method of claim 17, further comprising receiving alternating current (AC) power and converting the received AC power to DC power for integration with the DC power from the renewable energy source.

19. The method of claim 17, further comprising converting at least some of the received DC power into alternating current (AC) power and distributing AC power from the power panel.

20. The method of claim 17, further comprising applying a prioritization and control algorithm to maintain power at high priority circuits when renewable energy sources decline.

* * * * *